US007665663B2

(12) United States Patent
Hoffer et al.

(10) Patent No.: US 7,665,663 B2
(45) Date of Patent: Feb. 23, 2010

(54) METHOD AND APPARATUS FOR TARGET DISCRIMINATION WITHIN RETURN SIGNALS

(75) Inventors: Gary Hoffer, Alameda, CA (US); Donald McLemore, Albuquerque, NM (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 740 days.

(21) Appl. No.: 11/481,889

(22) Filed: Jul. 7, 2006

(65) Prior Publication Data
US 2008/0006694 A1      Jan. 10, 2008

(51) Int. Cl.
*G06K 7/00* (2006.01)
(52) U.S. Cl. .................. 235/435; 235/436; 235/439
(58) Field of Classification Search .............. 235/435, 235/436, 439, 462.08
See application file for complete search history.

(56) References Cited

U.S. PATENT DOCUMENTS 4,992,797 A    2/1991  Gjessing et al.
5,933,079 A    8/1999  Frink
5,986,602 A    11/1999 Frink
7,121,467 B2 * 10/2006 Winter et al. ............ 235/462.2
2002/0153891 A1  10/2002 Smith et al.
2007/0034697 A1 * 2/2007 Walsh .................. 235/472.01

FOREIGN PATENT DOCUMENTS

WO          9812573       3/1998

OTHER PUBLICATIONS

David L. Black, "An Overview of Impulse Radar Phenomenon," Proceedings of the National Aerospace and Electronics Conference, vol. CONF. 44, May 18, 1992, pp. 320-326.

* cited by examiner

*Primary Examiner*—Seung H Lee
(74) *Attorney, Agent, or Firm*—Edell, Shapiro & Finnan, LLC

(57) ABSTRACT

A template representing a desired target is applied to response signals from an area including a plurality of targets and illuminated by electromagnetic radiation. The response signals include poles or damped sinusoids representing resonances (e.g., resonant frequencies) distinctly associated with each of the targets within the area. An embodiment of the present invention utilizes pole or damped sinusoid frequencies of a desired target to construct the template or comb-like pattern that is compared to the mixture of pole frequencies within the response signals from the area. The comparison yields a resulting score that indicates the presence of the desired target within the area.

24 Claims, 6 Drawing Sheets

METHOD AND APPARATUS FOR TARGET DISCRIMINATION WITHIN RETURN SIGNALS

BACKGROUND OF THE INVENTION

1. Technical Field

The present invention pertains to target detection based on return or response signals from an electromagnetic transmission. In particular, the present invention pertains to discriminating targets within response signals from an area including a plurality of targets and illuminated by an electromagnetic transmission.

2. Discussion of Related Art

In order to detect target objects, an object or an area may be illuminated by an electromagnetic field. Electromagnetic signals are reflected from the object or area and received and processed to identify a target object. The scattered response or reflected signals typically exhibit a set of resonances (e.g., resonating frequencies, etc.) that may be represented by damped sinusoids or poles. This pattern is distinctive and may be used to identify the object. Several conventional mathematical techniques may be utilized to determine the parameters (e.g., frequencies, damping constants, etc.) of these sinusoids. For example, the Matrix Pencil Method (MPM) places sample data points from a waveform or response signal of interest within two matrices. The matrices are manipulated to provide pole parameters (e.g., frequencies, damping constants, etc.) as eigenvalues of a matrix equation. This technique is preferred since the technique provides greater stability and less sensitivity to noise relative to other techniques, such as Prony techniques.

When a desired target is part of a scene that includes several targets, the resulting scattering response contains poles from all objects in the illuminated scene, thereby hindering or preventing identification of the desired target.

OBJECTS AND SUMMARY OF THE INVENTION

Accordingly, it is an object of the present invention to discriminate targets within response signals.

It is another object of the present invention to detect particular target objects within response signals from an area including a plurality of targets.

Yet another object of the present invention to apply target templates to response signals from an area including a plurality of targets to detect and identify particular targets within that area.

The aforesaid objects may be achieved individually and/or in combination, and it is not intended that the present invention be construed as requiring two or more of the objects to be combined unless expressly required by the claims attached hereto.

According to the present invention, a template representing a desired target is applied to response signals from an area including a plurality of targets and illuminated by electromagnetic radiation. The response signals include poles or damped sinusoids representing resonances (e.g., resonant frequencies) distinctly associated with each of the targets within the area. An embodiment of the present invention utilizes pole or damped sinusoid frequencies of a desired target to construct a comb-like pattern that can be compared to the mixture of pole frequencies within the response signals from the area. The comparison yields a resulting score that indicates the presence of the desired target within the area.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

The present invention enables identification and/or detection of specific targets within an area including a plurality of target objects based on response or return signals produced from illumination of the area by an electromagnetic transmission. A template of pole or damped sinusoid frequencies that represent resonances (e.g., resonant frequencies, etc.) distinctly associated with a desired target is applied to the response signals from the illuminated area. The response signals include poles or damped sinusoid frequencies representing resonances distinctly associated with each of the targets within the area. The template is compared to the mixture of pole or damped sinusoid frequencies within the response signals, thereby yielding a resulting score that indicates the presence of the desired target within the area as described below.

Figure 1:
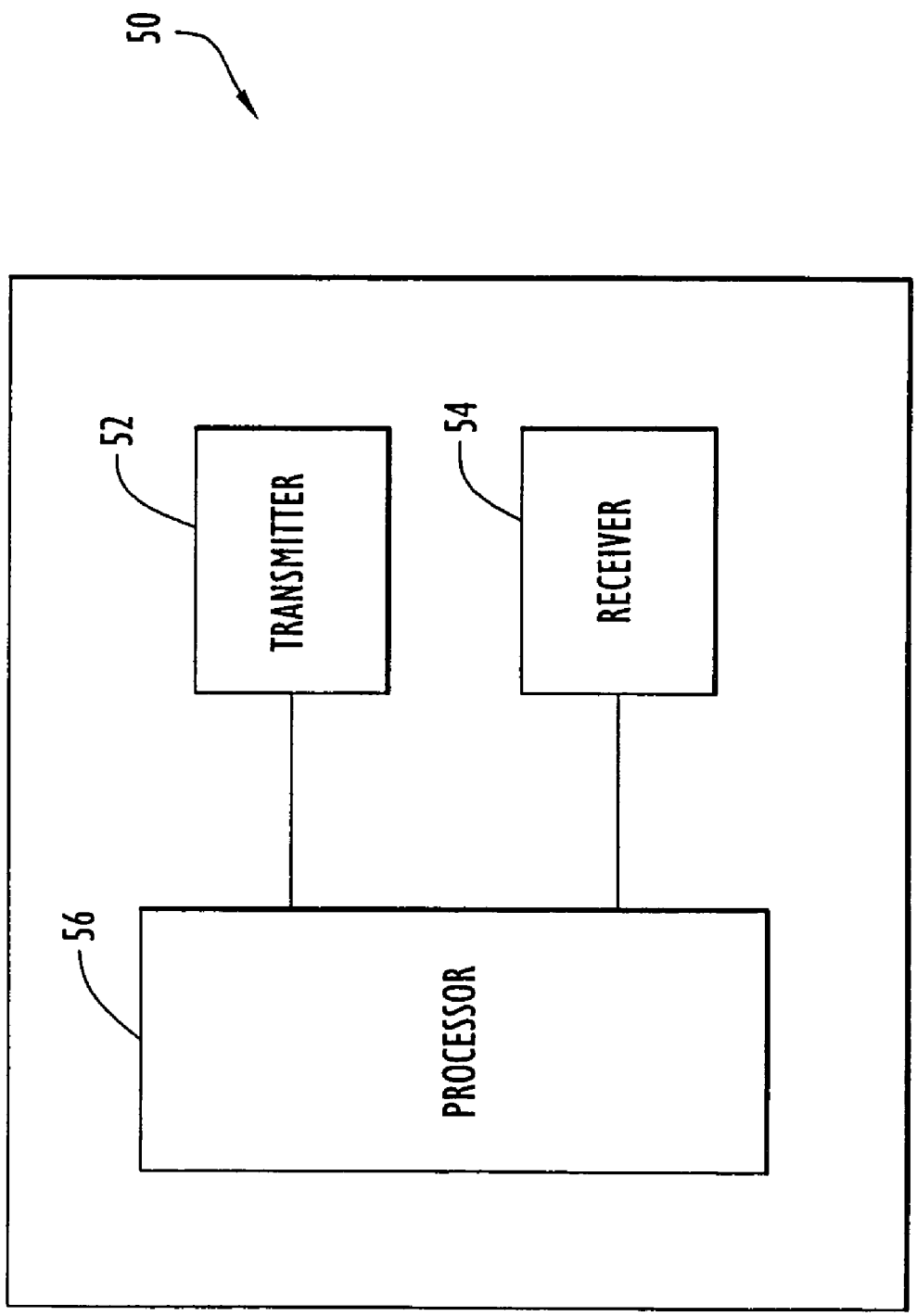
FIG. 1 is an exemplary target detection system employing target discrimination according to the present invention to identify desired targets within response signals from an area including a plurality of target objects and illuminated by electromagnetic radiation.

An exemplary target detection system employing the target discrimination of the present invention is illustrated in FIG. 1. Specifically, target detection system 50 includes a transmitter 52, a receiver 54 and a processor 56. The target detection system may be disposed in any suitable structure (e.g., vehicle, station, etc.) and/or embedded within any suitable systems (e.g., navigation, detection, etc.) for ground and/or air based detections of any desired targets (e.g., air or ground vehicles, weapons, etc.). The processor is preferably implemented by a conventional microprocessor or controller and controls the system to transmit and receive electromagnetic signals and to identify desired targets within received response or return signals reflected from an area as described below. The transmitter is preferably implemented by a conventional transmitter and transmits electromagnetic radiation, preferably in the form of electromagnetic or other appropriate signals, in accordance with processor instructions. Receiver 54 is typically implemented by a conventional receiver and configured to receive signals, preferably in the form of electromagnetic or other appropriate signals, transmitted by the transmitter and reflected from an illuminated area. The receiver receives the reflected or response signals and converts the received signals into a form (e.g., digital signals, etc.) suitable for processing by processor 56. The processor processes the return signals as described below to identify and indicate specific targets within the area.

Electromagnetic signals are transmitted by transmitter 52 toward an area with a plurality of targets to illuminate that area. The transmitted signals are reflected from the area and received by receiver 54 that converts and provides the received signals to processor 56 to identify a particular target object within the area. The scattered response or reflected signals include a set of resonances or resonant frequencies that may be represented by damped sinusoids or poles. This pattern is distinctive and may be used to identify a particular target.

Figure 2:
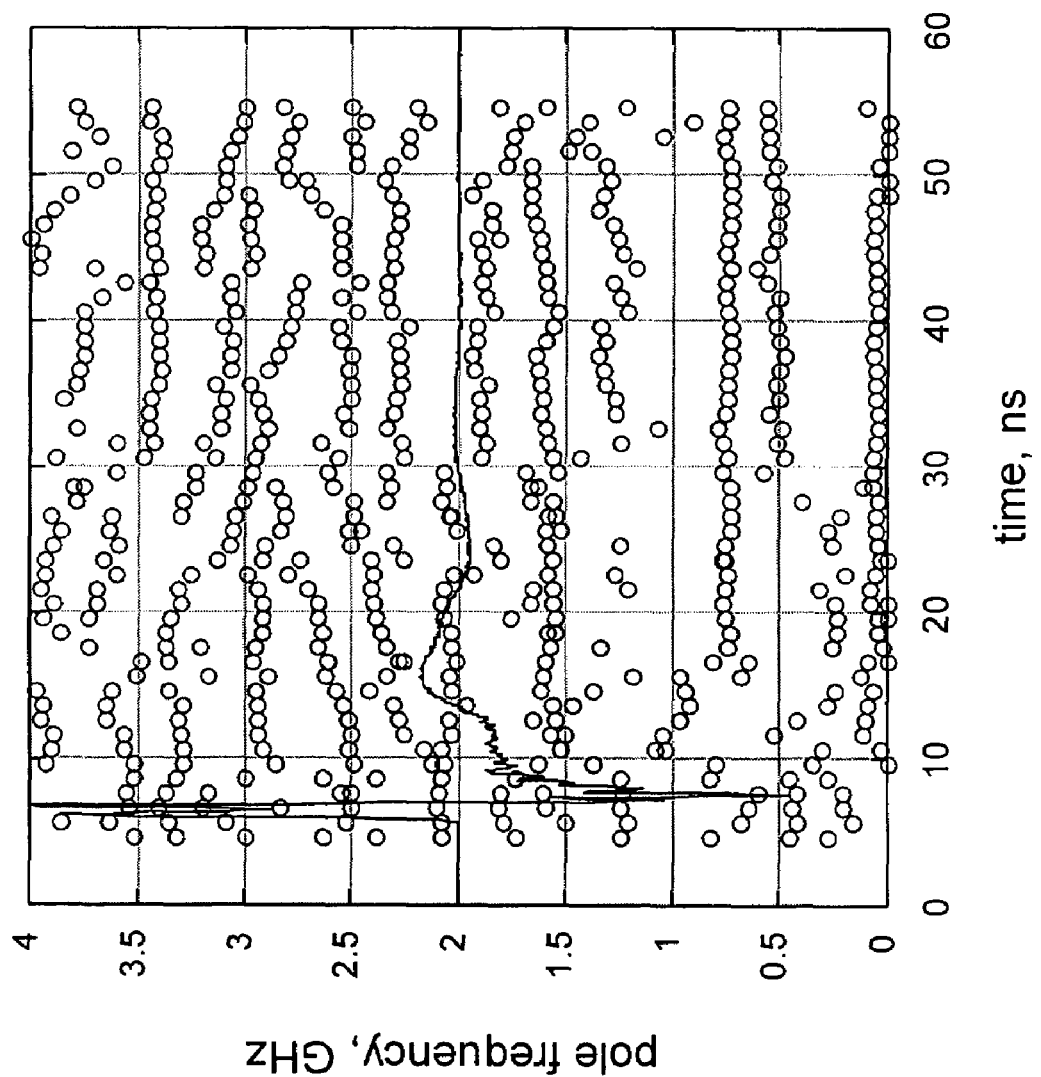
FIG. 2 is a graphical plot of an exemplary waveform or response signal and pole or damped sinusoid frequencies extracted from eight nanosecond intervals of the waveform in a moving sampling window.

A graphical plot of pole or damped sinusoid frequencies extracted from eight nanosecond intervals of an exemplary waveform (e.g., return or response signals from an area illuminated by electromagnetic radiation) in a moving sampling window is illustrated in FIG. 2. The response signals include poles or damped sinusoids representing respective sets of resonances (e.g., resonant frequencies) each distinctly associated with a corresponding target within the area. The solid line (e.g., as viewed in FIG. 2) represents the waveform to be analyzed and is graphically illustrated in terms of time (X-axis) versus pole frequency (Y-axis). Substantially circular indicators within the plot (e.g., as viewed in FIG. 2) indicate pole or damped sinusoid frequencies extracted by application of the Matrix Pencil Method (MPM) technique to sampled portions of the waveform. Each vertical line of circular indicators represents the frequencies from a portion of the waveform in an eight nanosecond sampling window centered at that time.

The Matrix Pencil Method (MPM) technique is a conventional technique that identifies principal frequencies in a given signal (e.g., an extension of Fourier analysis or other techniques). Basically, when a physical system is excited (e.g., an object is illuminated by electromagnetic radiation, an object receives a physical striking force, etc.), the system provides a ring down response including a series of characteristic exponentially damped sinusoids. The Matrix Pencil Method (MPM) processes a waveform (e.g., obtained through measurement, etc.) and determines the damped sinusoids contained in the waveform, or the best fit for the damped sinusoids. This information may be used to identify a desired target within return or response signals as described below.

Figure 3A:
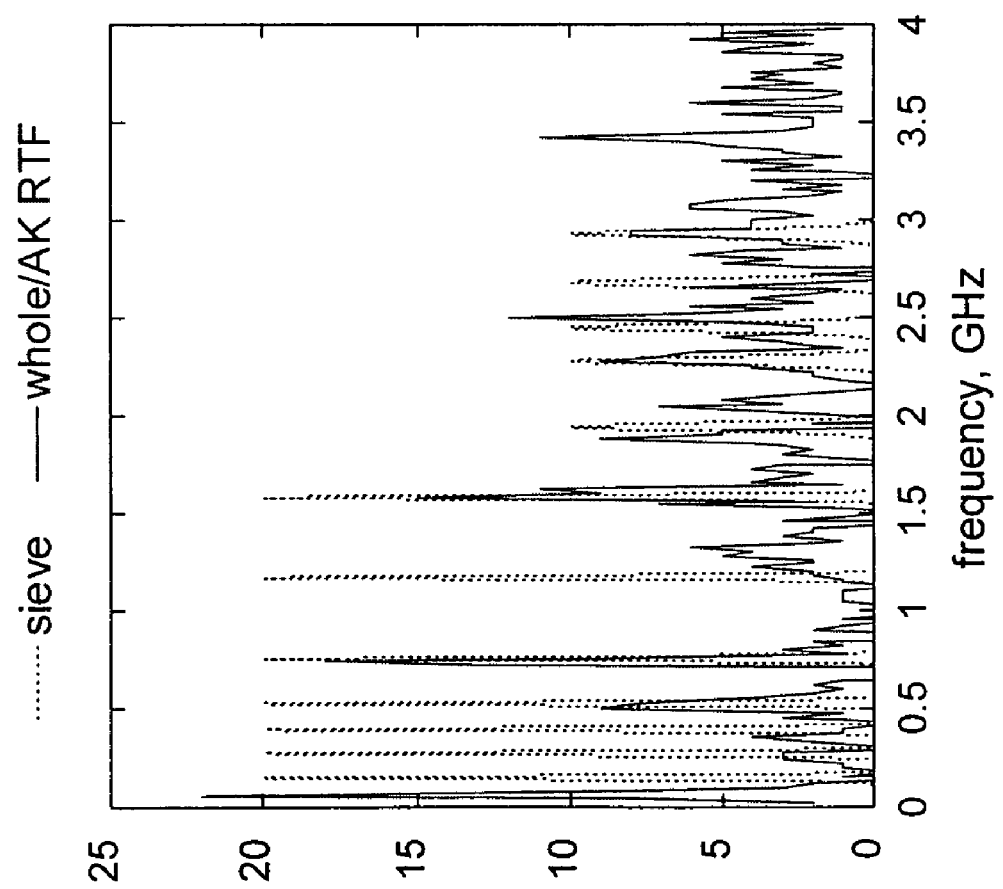
FIG. 3A is a graphical plot including a frequency sieve or template for a desired target and a histogram of the pole or damped sinusoid frequencies within the plot of FIG. 2.
Figure 3B:
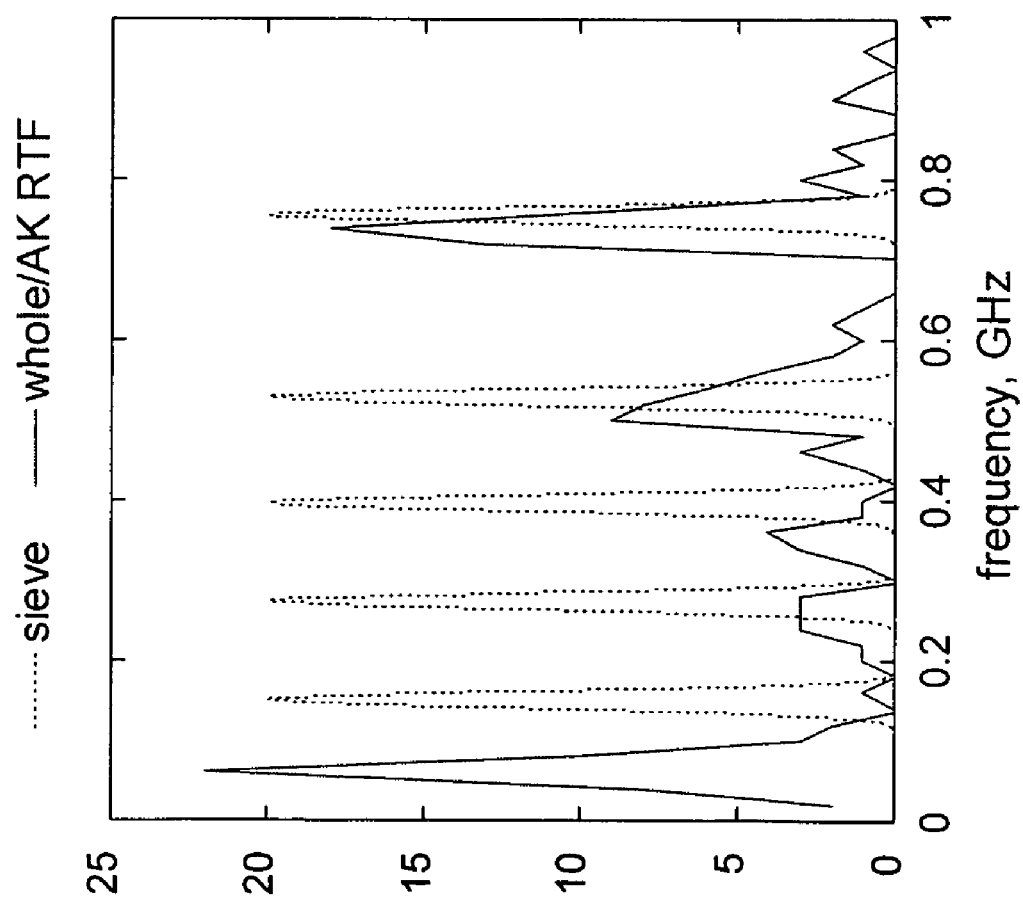
FIG. 3B is an expanded view of the low frequency portion of the plot of FIG. 3A.

Since each target object is associated with a set of resonances represented by pole or damped sinusoid frequencies as described above, a template or frequency sieve including the pole or damped sinusoid frequencies associated with a desired target is applied to the response signals received from an illuminated area. The frequency sieve may be constructed using known pole or damped sinusoid frequencies for a desired target. These frequencies may be obtained by measurements (e.g., illuminating desired targets with electromagnetic radiation and measuring the damped sinusoids or poles within return or response signals, etc.). An exemplary frequency sieve for a desired target (e.g., AK-47 weapon, etc.) and a histogram of waveform pole frequencies are graphically illustrated in FIGS. 3A-3B. The solid line for the graphical plot (as viewed in FIGS. 3A-3B) represents the histogram (e.g., the quantity of appearances of the frequencies (Y-axis) is graphically plotted against frequency (X-axis)) of the pole or damped sinusoid frequencies within the response signals from the illuminated area (FIG. 2), while the dashed line within the graphical plot represents the frequency sieve or template for the desired target. Some width about the pole or damped sinusoid frequencies is typically provided within the frequency sieve or template to accommodate the possibility of measurement and calculation errors. This may be accomplished by conventional distributions (e.g., Gaussian, uniform, etc.) centered on each frequency of the template.

Alternatively, the frequency sieve or template may be constructed from histograms of frequencies obtained from a Matrix Pencil Method (MPM) calculation. In particular, the MPM technique may be applied to a portion of a scattered or response waveform of a desired target (e.g., the portion contained within a sampling window). The sampling window is moved repeatedly to perform additional MPM calculations. The resulting histogram of frequencies identified by the MPM calculation includes peaks at the target frequencies and appropriate widths, thereby identifying the pole or damped sinusoid frequencies for a frequency sieve or template. These histograms may further assist in the formation of artificially constructed frequency sieves or templates (e.g., frequency sieves or templates mathematically produced based on the histograms and/or other data, etc.).

The frequency sieve or template may be used directly, or may have the histogram of other target objects subtracted from the frequency sieve to enable discrimination against objects with frequencies overlapping those of desired targets. This further tends to eliminate any systematic artifacts in the frequency sieve. The frequency sieve is compared to the mixture of pole frequencies within the response waveform (FIG. 2), thereby yielding a resulting score that indicates the presence of the desired target within the illuminated area.

Figure 4:
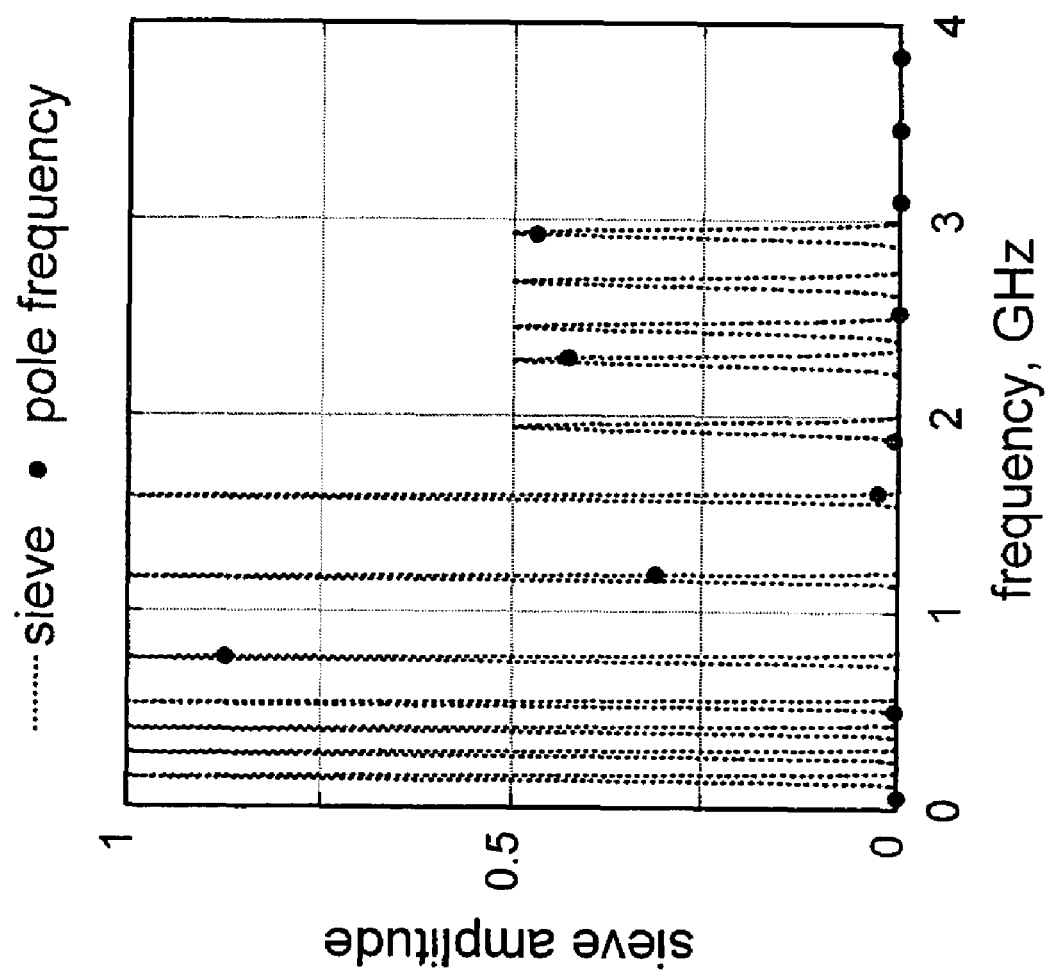
FIG. 4 is a graphical plot of a frequency sieve or template of a desired target including indications of pole or damped sinusoid frequencies extracted from an exemplary waveform under analysis.

An exemplary frequency sieve for a desired target is illustrated in FIG. 4. The dashed curve (e.g., as viewed in FIG. 4) represents the frequency sieve graphically plotted in terms of frequency (X-axis) versus amplitude (Y-axis), where substantially circular indicators on the curve indicate the frequencies extracted from an exemplary waveform (e.g., via the MPM technique as described below) under analysis (FIG. 2). The amplitude of the frequency sieve at any given frequency (e.g., frequencies extracted from the waveform) provides the measure of correlation between the frequency sieve and the response waveform at that given frequency. The sum of the amplitudes of the frequency sieve at the extracted waveform frequencies provides a score value that indicates the degree of correlation or matching between the pattern of frequencies in the waveform and those of the frequency sieve. The greater the score value, the higher the correlation between the waveform and frequency sieve, where a sufficiently high correlation indicates the presence of the desired target in the waveform. For example, an exact match between the frequency sieve and waveform at extracted frequencies produces a high score value indicating the presence of the desired target, while a low score value is produced in response to sieve and waveform differences.

When the waveform and frequency sieve or template sufficiently match, the desired target is identified and/or detected within the response signals. The matching is accomplished by comparing the resulting amplitude sum (e.g., sum of frequency sieve amplitudes at extracted waveform frequencies) to a threshold value. The threshold value is selected to enable identification of desired targets while minimizing generation of false alarms or detections. A calibration is performed in order to determine an appropriate threshold value for target detection, where the threshold may be determined via any suitable conventional techniques. For example, a technique employing a conventional Radio Operating Characteristics (ROC) curve may be employed to determine the threshold value. In this case, the ROC curve is generated based on the frequency sieve of the desired target and data typically received from an illuminated area. An operating point that best meets the needs of a desired application (e.g., a point that provides a proper balance between target detection and false alarms for a particular application) is selected from the generated ROC curve to serve as the threshold value.

Figure 5:
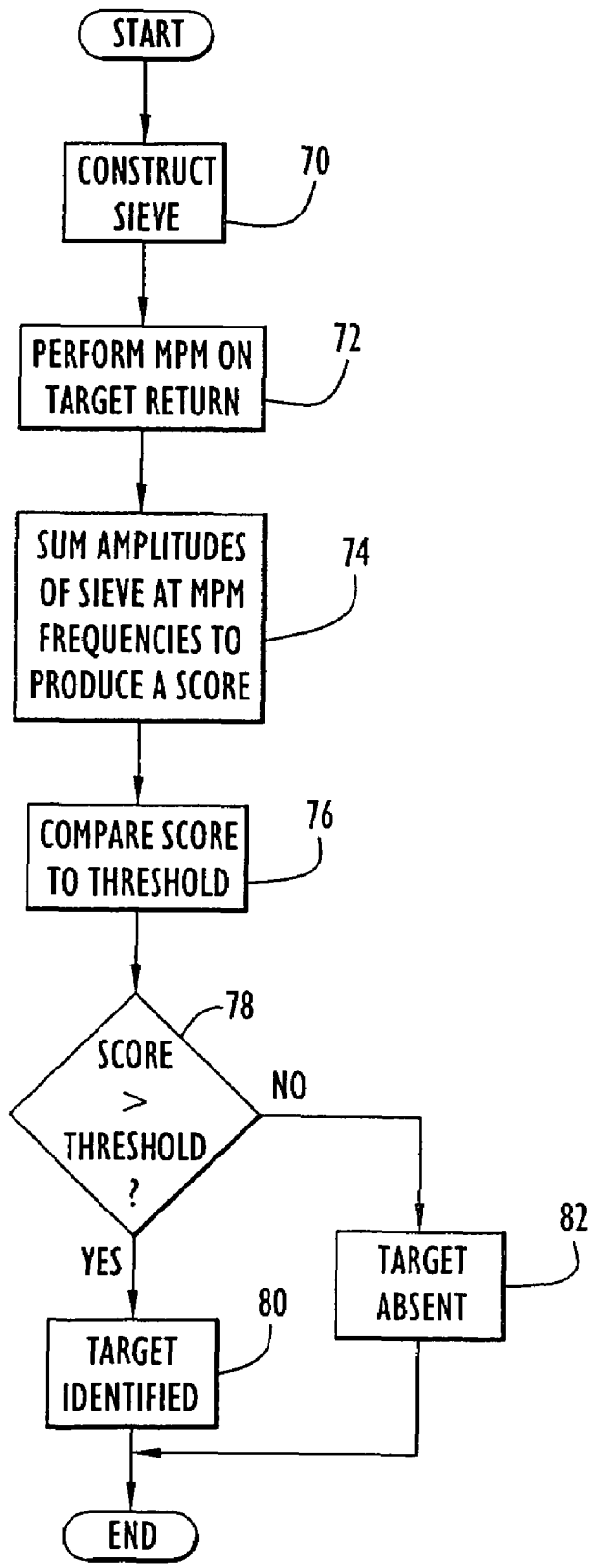
FIG. 5 is a procedural flow chart illustrating the manner in which a frequency sieve or template is applied to an exemplary waveform to identify desired targets according to the present invention.

The manner in which a frequency sieve is applied to a sampled response waveform to determine the presence of a desired target within an illuminated area is illustrated in FIGS. 2 and 5. Initially, transmitter 52 transmits electromagnetic signals to illuminate an area, and receiver 54 receives signals reflected from the illuminated area and converts and provides the signals to processor 56 for processing. Frequency sieves may be constructed for various desired target objects (e.g., AK-47 or other weapons, vehicles, etc.) in the manners described above and are stored in the processor and/or associated components (e.g., memory, etc.) at step 70. The frequency sieves may be arranged and stored in any desired fashion (e.g., table of frequency sieve data, list of frequency sieve data, graphically, etc.).

A Matrix Pencil Method (MPM) calculation is performed on the response signals or target waveform at step 72, where the resulting frequencies are compared with the frequency sieve associated with a desired target. In particular, the amplitudes of the frequency sieve at each of the principal frequencies identified by the MPM calculation are determined and added together to form a sum at step 74. The resulting sum of the sieve amplitudes at the target return MPM frequencies provides a score value that is utilized to determine the presence of the target associated with the frequency sieve. The score is compared to the threshold value at step 76 as described above. If the score exceeds the threshold as determined at step 78, the desired target is identified and indicated as being present within the illuminated area at step 80. Otherwise, the desired target is indicated as being absent from the illuminated area at step 82.

Since noise typically exists in the waveform along with the desired signal portions, utilization of a single sampling window (e.g., with noise and the desired signal) may skew the resulting values. Accordingly, the MPM calculation performed on the response signals or waveform may alternatively be performed utilizing a moving sampling window (e.g., scanning the waveform, etc.) to identify a peak sieve value versus time and enhance accuracy. In this case, a plurality of sampling windows may be utilized (e.g., fifty to one-hundred, etc.), where the resulting values are averaged. The averaging of result values may be accomplished by generating a histogram of the frequencies produced by the MPM calculation (e.g., the quantity of appearances of the frequencies is graphically plotted versus frequency) in each of a plurality of sampling windows. The frequencies with the greatest amount of appearances within the plurality of windows (e.g., peaks of the generated histogram, etc.) are utilized to retrieve and sum amplitudes from the frequency sieve at those frequencies and determine a score value as described above. The plural sampling window approach provides a more accurate representation of the frequencies contained in the response waveform relative to use of a single sampling window. This approach further enables the system to scan through the response waveform to determine the position along the waveform of a response signal from the desired target when the location of the target in the waveform is unknown.

The time interval for each sampling window and the amount of advancement within the response waveform for a successive sampling window (e.g., advancement of the sampling window for each re-sampling of the waveform) generally retain the same values during processing (although the parameters themselves may be set to the same or different values from one another). By way of example, a sampling window typically includes a maximum time interval of ten nanoseconds.

Further, the parameters (e.g., center frequencies, amplitudes, widths, etc.) of the artificially constructed sieve may be adjusted to maximize the response to a desired target while minimizing responses to other objects that may appear within the area. In other words, the frequency sieve may be trained for identification and/or detection of desired targets. Moreover, the frequency sieve may include pole damping constants in addition to the pole frequencies for correlation with damped sinusoids (e.g., frequencies, damping constants, etc.) extracted from the response waveform in substantially the same manner described above. In this case, the frequency sieve may be represented with poles distributed on the complex plane (e.g., real and imaginary axes) and frequency sieve amplitudes including peaks in a surface contour above that plane (e.g., a three dimensional graphical representation (e.g., real, imaginary and amplitude axes) with complex frequency sieve poles accounting for the damping constants). The frequencies and damping constants corresponding with the desired target include greater amplitude values within the frequency sieve. This produces a high score value (e.g., summation of amplitudes) in response to the same or similar frequencies being extracted from the waveform in order to facilitate detection and/or identification of a desired target in substantially the same manner described above.

Operation of the present invention is described with reference to FIGS. 1-4. Initially, transmitter 52 transmits electromagnetic signals to illuminate an area, and receiver 54 receives signals reflected from the illuminated area (e.g., the waveform of FIG. 2) and converts and provides the signals to processor 56 for processing. Frequency sieves may be constructed for various desired target objects (e.g., AK-47 or other weapons, vehicles, etc.) in the manners described above and are stored in processor 56 (e.g., FIGS. 3A-3B). The processor performs a Matrix Pencil Method (MPM) calculation on the response signals or target waveform. This may be performed for one or more sampling windows as described above. The amplitudes of the frequency sieve at each of the determined MPM frequencies are retrieved and added together to form a sum (e.g., FIG. 4). The resulting sum provides a score that is compared to a threshold to determine the presence of a target associated with the frequency sieve. Various frequency sieves or templates each associated with a corresponding target may be applied to the waveform in substantially the same manner described above to determine the presence of the corresponding targets within the illuminated area.

It will be appreciated that the embodiments described above and illustrated in the drawings represent only a few of the many ways of implementing a method and apparatus for target discrimination within return signals.

The present invention system may include any quantity of any conventional or other transmitters, where each transmitter may transmit signals at any suitable frequency and in any suitable energy form (e.g., radio signals, microwave, optical signals, etc.), and any quantity of conventional or other receivers, where each receiver may receive signals at any suitable frequency and in any suitable energy form (e.g., radio signals, microwave, optical signals, etc.). The receiver or system may include any conventional or other circuitry (e.g., A/D converters, mixers, down converters, etc.) to convert the received signals to any suitable form for processing (e.g., analog signals, digital signals, etc.). Alternatively, the present invention system may include any quantity of combined transmitting/receiving devices. The target detection system may be disposed in any suitable structure (e.g., vehicle, station, etc.) and/or embedded within any suitable systems (e.g., navigation, detection, etc.) for ground and/or air based detections of any desired targets (e.g., air or ground vehicles, weapons, etc.).

The processor of the present invention system may be implemented by any conventional or other microprocessor, controller or circuitry to perform the target discrimination and other functions described herein, while any quantity of processors or processing devices or circuitry may be employed within the present invention system, where the processor functions may be implemented by, and distributed in any fashion among, any quantity of hardware (e.g., processors or other processing devices, circuits, etc.) and/or software modules or units. The software for the processor of the present invention system may be implemented in any suitable computer language, and could be developed by one of ordinary skill in the computer and/or programming arts based on the functional description contained herein and the flow chart illustrated in the drawings. Further, any references herein of software performing various functions generally refer to processors performing those functions under software control. The software and/or algorithms described above and illustrated in the flow charts may be modified in any manner that accomplishes the functions described herein. The software of the present invention may be available on a recordable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium.

The frequency sieve or template may be of any quantity and may be compared to the response or return signal in any desired fashion (e.g., individually, a combination of one or more templates, etc.) to produce a correlation for target discrimination. The template may be constructed based on actual measurements of desired targets, or may alternatively be artificially constructed or derived from various data (e.g., histograms, etc.) via any conventional or other techniques (e.g., MPM, etc.). The template may include any quantity of damped sinusoid or pole frequencies for a desired target, and may include any suitable amplitude or other characteristic values for corresponding frequencies. The amplitude or other characteristic values (e.g., damping constants, frequencies, etc.) may be combined in any suitable fashion to produce a score value (e.g., sum, averaged, weighted sum, etc.). The template may include any suitable width surrounding the pole frequencies which may be determined by any conventional or other techniques (e.g., Gaussian, uniform or other distributions at any locations proximate the pole frequencies, etc.). The template may include or account for any quantity of any suitable characteristics (e.g., pole frequencies, damping constants, etc.) for any quantity of desired targets to perform the target discrimination. The template may be arranged in any format (e.g., table or list of characteristics, graph of characteristics plotted against any suitable variants (e.g., time, amplitude, frequency, etc.), etc.) for storage in any quantity of any conventional or other suitable storage devices (e.g., processor, memory, database, etc.). The parameters or characteristics within the templates may be adjusted in any manner to enhance detection of one or more particular targets (e.g., the template may be trained for particular targets). Further, the template may be modified by removing histograms of interfering frequencies associated with objects to enhance detection of desired targets. The template may be utilized or associated with any types of targets (e.g., vehicles, weapons, ammunition, etc.).

The target discrimination of the present invention may utilize any quantity of stationary or moving sampling windows, where the sampling window may be of any desired time interval or duration suitable to detect the desired target (e.g., nanoseconds, etc.). The moving sampling window may be shifted through the return signal by any desired interval or amount, where the data from a plurality of sampling intervals may be combined in any fashion (e.g., summation, averaging, weighted sum, etc.) to produce the resulting score. The target discrimination may employ any quantity of any conventional or other techniques to process and extract information (e.g., pole frequencies, damping constants, etc.) from the return signals (e.g., MPM, Prony, Fourier analysis, etc.). The target discrimination system may be utilized to detect any types of targets (e.g., vehicles, weapons, ammunition, etc.).

The threshold value may be determined via any conventional or other techniques (e.g., ROC curve, etc.) and be set any desired values to control sensitivity to target detections. The score value may be compared to the threshold via any suitable techniques to determine the presence of a desired target (e.g., greater than, greater than or equal to, equal to, less than, less than or equal to, etc.). The system may utilize any quantity of threshold values for comparison with any quantity of score values (e.g., to provide acceptable ranges, etc.). The threshold comparison may be performed any quantity of times, where the comparisons may be combined in any fashion to determine a detection (e.g., the comparison indicates a detection for at least a certain quantity of iterations prior to indicating detection, etc.).

From the foregoing description, it will be appreciated that the invention makes available a novel method and apparatus for target discrimination within return signals, wherein pole or damped sinusoid frequencies of a desired target are utilized to construct a comb-like pattern or template that can be compared to a mixture of pole frequencies within response signals from an area illuminated by electromagnetic radiation to determine the presence of the desired target within the area.

Having described preferred embodiments of a new and improved method and apparatus for target discrimination within return signals, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A system for discriminating targets within return signals comprising:
   a transmitter to transmit signals to illuminate an area including at least two targets;
   a receiver to receive said transmitted signals reflected and returned from said area; and
   a processor to process said return signals to determine the presence of a desired target within said area, wherein said processor includes:
      a storage unit to store a template including characteristics of damped sinusoids representing a set of resonances distinctly associated with said desired target; and a detection module to extract information from said return signals related to damped sinusoids representing sets of resonances associated with said at least two targets and to compare said template with said extracted information from said return signals to determine the presence of said desired target within said area.

2. The system of claim 1, wherein said template includes amplitude values corresponding to frequencies of said damped sinusoids.

3. The system of claim 2, wherein said detection module includes:
   a waveform module to extract said information related to damped sinusoids within said return signals;
   a score module to determine a score value by summing amplitude values from said template corresponding to damped sinusoid frequencies within said extracted information; and
   a compare module to compare said score value to a threshold to determine the presence of said desired target within said area.

4. The system of claim 3, wherein said waveform module utilizes a Matrix Pencil Method technique to extract said information.

5. The system of claim 3, wherein said threshold is determined based on an operating point within a Radio Operating Characteristics curve generated in accordance with said template.

6. The system of claim 3, wherein said waveform module includes:
   a sampling module to sample said return signals within a sampling window of a predetermined interval, wherein said information is extracted from said sampled return signals.

7. The system of claim 6, wherein said sampling module samples said return signals within a stationary sampling window.

8. The system of claim 6, wherein said sampling module samples said return signals within a moving sampling window to scan said return signals.

9. The system of claim 1, wherein said template is produced based on actual measurements of said desired target.

10. The system of claim 1, wherein said template is mathematically derived based on return signals from said desired target.

11. The system of claim 1, wherein said template includes amplitude values corresponding to frequencies and damping constants of said damped sinusoids.

12. The system of claim 1, wherein said storage unit stores a plurality of templates each associated with a corresponding target, and said detection module determines the presence of a plurality of targets within said area by comparing each template associated with one of said plurality of targets to said extracted information.

13. A method of discriminating targets within return signals reflected from an area including at least two targets and illuminated by transmitted signals, said method comprising:
   (a) extracting information from said return signals related to damped sinusoids representing sets of resonances associated with said at least two targets; and
   (b) comparing a template associated with a desired target with said extracted information from said return signals to determine the presence of said desired target within said area, wherein said template includes characteristics of damped sinusoids representing a set of resonances distinctly associated with said desired target.

14. The method of claim 13, wherein said template includes amplitude values corresponding to frequencies of said damped sinusoids.

15. The method of claim 14, wherein step (a) further includes:
   (a.1) determining a score value by summing amplitude values from said template corresponding to damped sinusoid frequencies within said extracted information; and
   (a.2) comparing said score value to a threshold to determine the presence of said desired target within said area.

16. The method of claim 15, wherein step (a.2) further includes:
   (a.2.1) determining said threshold based on an operating point within a Radio Operating Characteristics curve generated in accordance with said template.

17. The method of claim 13, wherein step (a) further includes:
   (a.1) extracting said information by applying a Matrix Pencil Method technique to said return signals.

18. The method of claim 13, wherein said template is produced based on actual measurements of said desired target.

19. The method of claim 13, wherein said template is mathematically derived based on return signals from said desired target.

20. The method of claim 13, wherein step (a) further includes:
   (a.1) sampling said return signals within a sampling window of a predetermined interval, wherein said information is extracted from said sampled return signals.

21. The method of claim 20, wherein step (a.1) further includes:
   (a.1.1) sampling said return signals within a stationary sampling window.

22. The method of claim 20, wherein step (a.1) further includes:
   (a.1.1) sampling said return signals within a moving sampling window to scan said return signals.

23. The method of claim 13, wherein said template includes amplitude values corresponding to frequencies and damping constants of said damped sinusoids.

24. The method of claim 13, wherein step (b) further includes:
   (b.1) determining the presence of a plurality of targets within said area, wherein each of said plurality of targets is associated with a corresponding template and each template associated with one of said plurality of targets is compared to said extracted information to determine the presence of that target within said area.

* * * * *